(12) United States Patent
Glover et al.

(10) Patent No.: US 12,001,014 B2
(45) Date of Patent: Jun. 4, 2024

(54) DUST MITIGATION FOR OPTICAL DEVICES

(71) Applicant: Caterpillar Global Mining Equipment LLC, Denison, TX (US)

(72) Inventors: Rex Aaron Glover, Deer Creek, IL (US); Brian C. Crow, Metamora, IL (US); Raymond Alan Wise, Metamora, IL (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 682 days.

(21) Appl. No.: 16/710,330

(22) Filed: Dec. 11, 2019

(65) Prior Publication Data

US 2021/0181501 A1    Jun. 17, 2021

(51) Int. Cl.
*G02B 27/00* (2006.01)
*B08B 5/02* (2006.01)
*F21S 6/00* (2006.01)
*G03B 19/02* (2021.01)

(52) U.S. Cl.
CPC ............ *G02B 27/0006* (2013.01); *B08B 5/02* (2013.01); *F21S 6/002* (2013.01); *G03B 19/02* (2013.01)

(58) Field of Classification Search
CPC ..... B60S 1/0848; B60Q 1/0023; G02B 27/00; B08B 5/02; G03B 19/02; F21S 6/00
See application file for complete search history.

(56) References Cited

U.S. PATENT DOCUMENTS

| | | | |
|---|---|---|---|
| 4,040,473 A * | 8/1977 | Wheeler | F28D 17/00 165/5 |
| 2011/0073142 A1* | 3/2011 | Hattori | B60S 1/52 134/198 |
| 2016/0103316 A1 | 4/2016 | Rousseau | |
| 2020/0324738 A1* | 10/2020 | Kubota | B60S 1/60 |

FOREIGN PATENT DOCUMENTS

| | | |
|---|---|---|
| CN | 206436913 U | 8/2017 |
| WO | 2019094330 A1 | 5/2019 |

* cited by examiner

*Primary Examiner* — William J Carter (57) ABSTRACT

A system and method for dust mitigation in an environment with high amounts of debris is disclosed. The system may include an optical device disposed within an interior volume of an enclosure. A positive flow of clean air may be maintained into an air input aperture of the enclosure, around the optical device, over a lens of the optical device, and out a lens aperture of the enclosure. The system may be affixed to a piece of equipment, machine, or similar structure via a positionable or pivotable mount.

18 Claims, 6 Drawing Sheets

DUST MITIGATION FOR OPTICAL DEVICES

TECHNICAL FIELD

The present disclosure generally relates to dust mitigation devices and methods, and more specifically to an enclosure for an optical device used in high debris environments.

BACKGROUND

A variety of optical devices are used in environments with a high amount of dust, debris, or other contaminants, such as construction, mining, military, or agricultural sites or locations. Such optical devices may be used to improve visibility for users, such as onboard operators, to remotely view and/or operate a piece of machinery, or to monitor an environment. The optical devices may be used with autonomous vehicles such as ground-based vehicles, air-based vehicles, or any other type of vehicle. The high amount of dust or debris may gather, clump, or otherwise settle on a lens of such an optical device, thereby obscuring the lens and preventing the optical device from operating properly. For example, a high amount of dust expelled from a drilling operation may accumulate on the lens of a remote monitoring camera and prevent the remote monitoring.

When the optical device becomes dirty, periodic maintenance is needed to clean the optical device. Some environments have an extreme amount of dust or debris which requires frequent cleaning of the optical device. The periodic maintenance may require in site operations to cease while the optical device is cleaned. The cleaning may be additionally troublesome if the optical device is located in a relatively inaccessible position and/or if additional service personnel are needed for cleaning. These difficulties may be further compounded when the optical device is used in conjunction with remotely operated equipment or machinery. The amount of dust and debris in such locations may be unsafe or unhealthy for people. As such, service personnel are often required in environments in which people are not or should not be present. Further, the optical device may be in a location which is difficult to access, thereby requiring specialized equipment to clean the optical device.

Due to the time, care, and specialized tools required to keep such optical devices clean, it has become common to use additional equipment with such optical devices to remotely clean the optical devices. While such additional equipment provides the ability to clean the optical devices once they get dirty without the need of additional service personnel, the additional equipment does not prevent the optical device from getting dirty and may require site operations to cease such that the additional equipment may clean the optical device.

U.S. Patent Application Publication Number 2016/0103316, titled "Device for cleaning a motor vehicle driving aid camera," discloses a cleaning device for a cleaning a lens of a camera via a plurality of nozzles and a cleaning liquid. While the disclosed track joint link includes a threaded pivot pin which may secure the pairs of track links by threading the pivot pin through threaded openings in the track links, the cleaning device does not prevent the lens of the optical device from getting dirty.

SUMMARY

In accordance with aspects of this disclosure, there is provided a system for dust mitigation in an environment with high amounts of debris. The system includes an optical device including a lens disposed in a front end, an enclosure including an air input aperture and a lens aperture and defining an interior volume, and a hose connected to the air input aperture of the enclosure. The hose may supply clean air into the interior volume of the enclosure. Clean air may flow into the air input aperture, around the optical device, over the lens of the optical device, and out the lens aperture of the enclosure.

In accordance with other aspects, there is provided a method for mitigating dust in an environment with high amounts of debris. The method includes placing an optical device within an interior volume of an enclosure, securing the optical device within the enclosure such that a lens of the optical device is near and aligned with a lens aperture of the enclosure, attaching a hose to an air input of the enclosure, and providing a positive flow of air into the air input aperture, over the lens of the optical device, and out the lens aperture of the enclosure.

In accordance with other aspects, there is provided an optical device for use in an environment with high amounts of debris. The optical device includes a lens, a lens aperture aligned with the lends, an air input aperture, and a power source which may provide power to the lens. The clean air may be provided into the air input aperture, over the lens, and out the lens aperture.

BRIEF DESCRIPTION OF THE DRAWINGS

Further features and advantages of the invention will become apparent from the description of embodiments using the accompanying drawings. In the drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
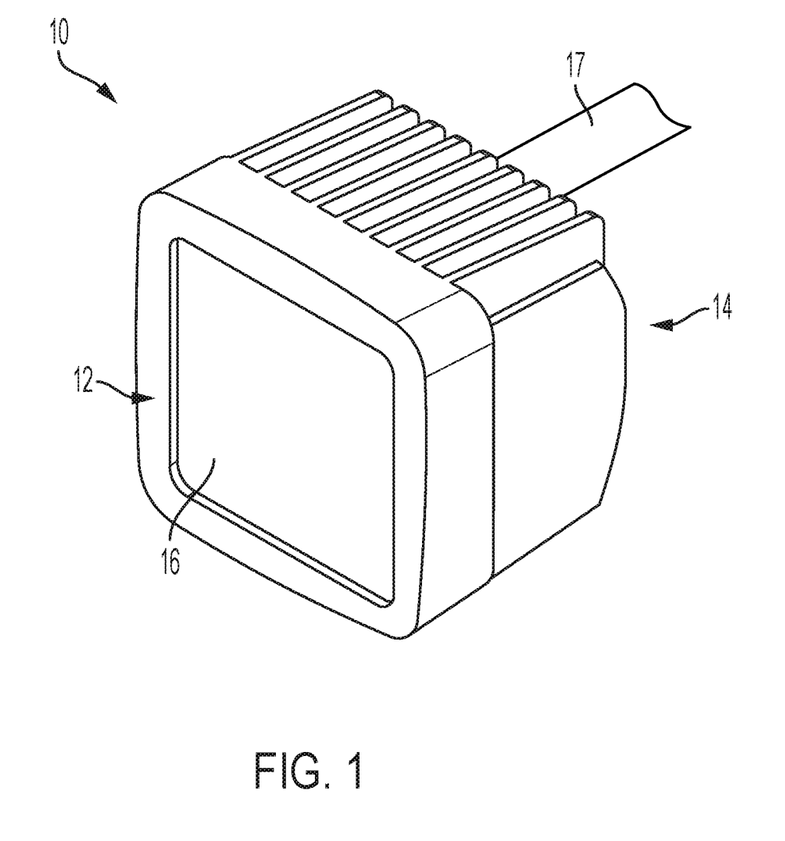
FIG. 1 is a perspective schematic view of an exemplary embodiment of an optical device.

Referring to FIG. 1, an optical device 10 is shown. The optical device 10 may be any type of optical device used in an environment subject to a large amount of dust or other debris, such as a manufacturing or machining site. For example, the optical device 10 may be a video camera, an infrared camera, a spectrum camera, a lamp, an infrared sensor, a radar detector, a laser, a light sensor, or any other optical instrument. In the illustrated embodiment, the optical device 10 is a lamp.

The optical device 10 has a front end 12 and a rear end 14. The front end 12 includes a front surface or lens 16. The lens 16 may be a camera lens, a lamp lens, a touch screen, or similar front surface of an optical device. The lens 16 may allow the optical device 10 to illuminate, view, capture, or sense the ambient environment in which the optical device 10 is placed.

Figure 3:
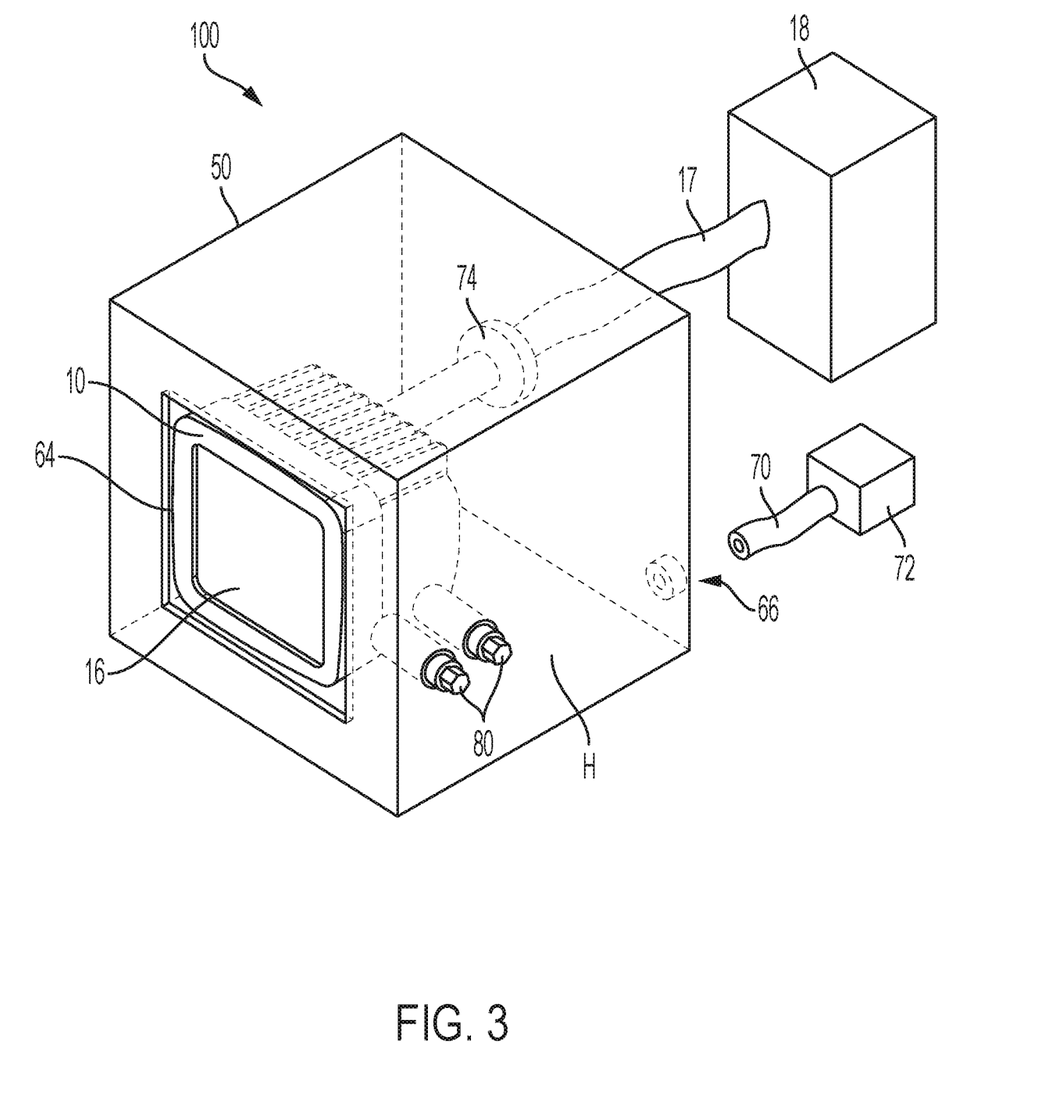
FIG. 3 is perspective schematic view of an exemplary embodiment of a system for debris mitigation including the optical device of FIG. 1 and the enclosure of FIG. 2.

Turning now to FIG. 3, the optical device 10 may also include or be electrically connected to a power source 17. The power source 17 may be an external source of power, such as an engine, generator, power grid, or similar source of power, electrically connected to the optical device 10. The optical device 10 may be electrically connected to the power source 17 via a cable or conduit 18 for conveying power. Alternatively, the power source 17 may be a battery affixed, internal, or integral to the device 10. In the illustrated embodiment, the power source 17 is an external source of power electrically connected to the optical device 10 via a cable 18 attached to the rear end 14 of the optical device 10. The power source 17 may deliver a constant flow of energy or power to the optical device 10.

The optical device 10 may be remotely operated and controlled and may also include one or more controls (not shown) for user operation of the optical device 10. The controls may be buttons, knobs, sliders, dials, or any other mechanisms which a user may press or manipulate to adjust the functionality of the optical device 10.

Figure 2:
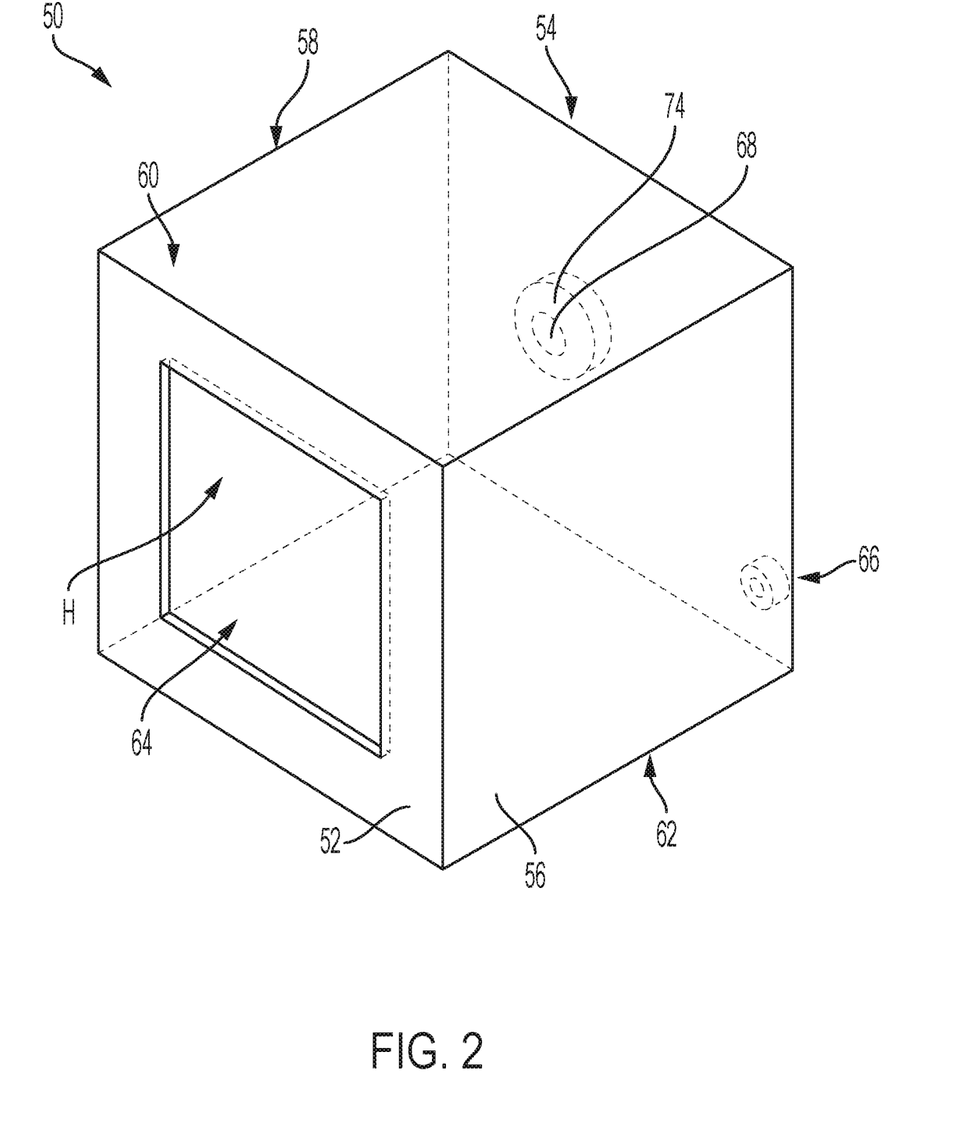
FIG. 2 is a perspective schematic view of an exemplary embodiment of an enclosure.

As shown in FIG. 2, an enclosure 50 is shown which may be used with the optical device 10. In the illustrated embodiment, the enclosure 50 is a generally rectangular box with a front end 52, a rear end 54, a first side 56, a second side 58, a top surface 60, and a bottom surface 62. The front end 52, the rear end 54, the first side 56, the second side 58, the top surface 60, and the bottom surface 62 define an interior space or volume H. The enclosure 50 may be sized and shaped to fit the optical device 10 in the interior volume H of the enclosure 50. Additionally, the enclosure 50 may be sized and shaped to correspond to the size and shape of the optical device 10. While the enclosure 50 has been depicted as a generally rectangular box, it will be appreciated that the enclosure 50 may take a variety of shapes. For example, the enclosure 50 may be rounded, substantially the same shape as the optical device 10, or any other suitable shape.

The front end 52 of the enclosure 50 includes a lens opening or aperture 64. The aperture 64 may be sized, shaped, and positioned in the front end 52 to correspond to the lens 16 of the optical device 10, as detailed below. The lens aperture 64 may be substantially the same size and shape as the lens 16 of the electronic device.

The enclosure 50 includes an air input aperture or passage 66. The air input aperture 66 may provide a supply of clean air into the interior volume H of the enclosure 50. In the illustrated embodiment, the air input aperture 66 is located in the rear end 54 near the first side 56 and the bottom surface 62. However, the air input aperture 66 may be in other locations. For example, the air input aperture 66 may be anywhere in the enclosure 50 such that air entering the interior volume H of the enclosure 50 may provide a positive flow of air around the optical device 10 and out of the lens aperture 64, as described below.

The air input aperture 66 of the enclosure 50 may be sized, shaped, or otherwise configured to receive or couple with a conduit 70. For example, the air input aperture 66 and the conduit 70 may be configured to threadingly connect. The conduit 70 may be a hose, pipe, tube, duct, or similar conduit which may convey a gas. The conduit 70 may be connected to a clean air or gas supply 72 to supply a positive flow of clean air or gas through the air input aperture 66 and into the interior volume H of the enclosure 50. The gas supply 72 may be a pressurized tank containing oxygen, air, or other gas which may mitigate accumulation of dust on the lens 16 of the optical device 10, as detailed below. Additionally, the gas supply 72 may be a blower, fan, or similar device capable of supplying a flow of gas or air.

The enclosure 50 may include a cable channel or passage 68. The cable passage 68 may be sized and shaped to fit or receive the cable 18 electrically connecting the optical device 10 to the power source 17. The enclosure 50 may include a seal 74 disposed between the cable passage 68 and cable 18. The seal 74 may be a grommet, a gland, a press fit seal, a snap fit seal, or any other seal which may maintain a substantially airtight seal between the cable passage 68 of the enclosure 50 and cable electrically connected the power source 17. The seal 74 may be designed or configure such that it may be placed between the cable passage 68 and cable 18 after the cable 18 has been fit or placed through the cable passage 68 of the enclosure 50.

The enclosure 50 may be configured, formed, or otherwise constructed in a variety of ways to accommodate the optical device 10 within the interior volume H of the enclosure 50 and to provide a substantially airtight volume around the optical device 10 apart from the lens aperture 64 and the air input aperture 66. For example, the enclosure 50 may be split into two securable parts such that the pieces of the enclosure 50 may be put together around the optical device 10 and then secured. Alternatively, the enclosure 50 may be formed or constructed around the optical device 10.

Referring to FIG. 3, a system 100 for dust or debris mitigation is shown. The system 100 includes the optical device 10 mounted within the enclosure 50. The optical device 10 may be mounted within the enclosure 50 with one or more fasteners 80. The optical device 10 may be positioned within the enclosure 50 such that the lens 16 of the optical device 10 is near and substantially aligned with the lens aperture 64 of the enclosure 50. The optical device 10 may be positioned within the enclosure 50 such that air may flow into the air input aperture 66, around the optical device 10, over the lens 16 of the optical device 10, and out the lens aperture 64 of the enclosure 50, as detailed below. The gas supply 72 may provide a continuous flow of clean air to the system 100. Once the optical device 10 is properly positioned within the enclosure 50, the optical device 10 may be secured in the enclosure 50 via one or more fasteners 80. The one or more fasteners 80 may extend through the enclosure 50 and into the optical device 10 to secure the device 10. The one or more fasteners 80 may extend through one or more preformed passages in the enclosure 50 and into one or more preformed passages in the optical device 10.

Figure 4:
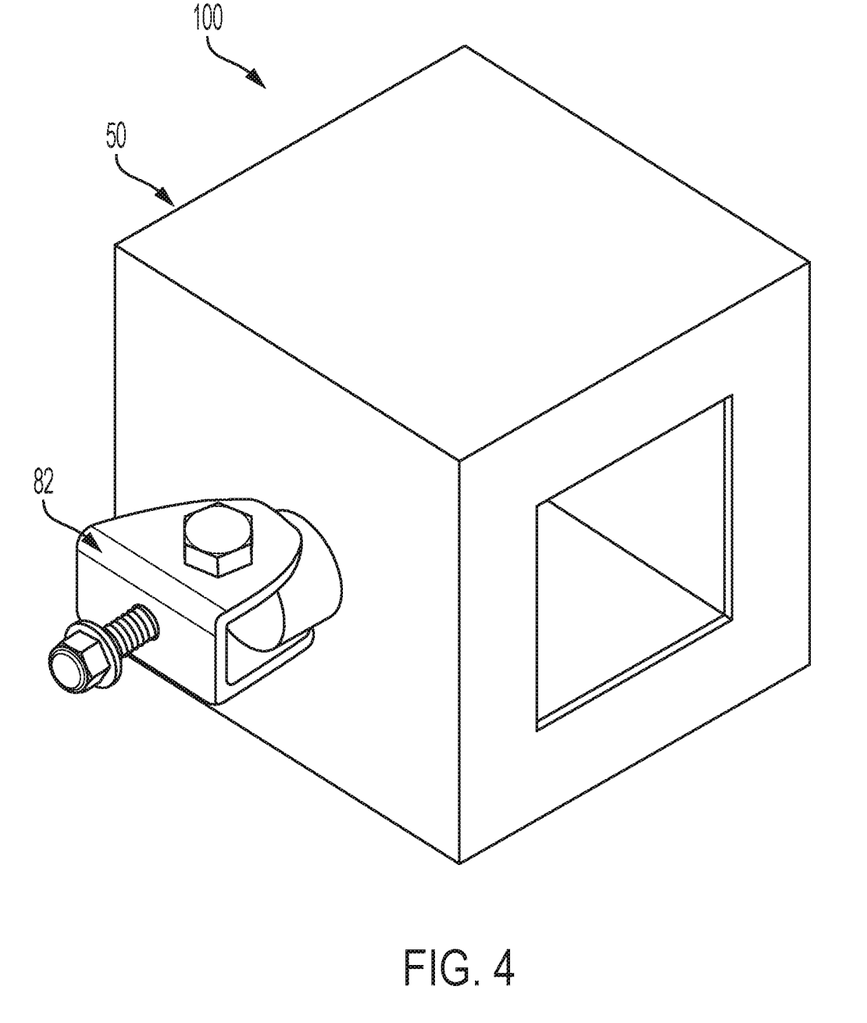
FIG. 4 is a flow chart of a method for mitigating dust in an environment with high amounts of debris.

Referring to FIG. 4, a stand or mount 82 may be affixed to the enclosure 50 of the system 100. The mount 82 may be affixed to the enclosure 50 via a weld, one or more fasteners, or any other suitable connections. The mount 82 may be pivotable, maneuverable, or otherwise positionable. The mount 82 may be used to affix or otherwise secure the system 100 to a machine, structure, or other location in which the optical device 10 and enclosure 50 will be used. Alternatively, the system 100 may be attached or otherwise secured directly to the machine, structure, or other desired location. The system 100 may be positioned and the optical device 10 and the enclosure 50 may be aligned such that the lens 16 of the optical device 10 is directed in the desired direction.

Further, the enclosure 50 may optionally include additional apertures (not pictured). The additional apertures may correspond to knobs, controls or other similar features of the optical device 10. The additional apertures may allow a user to manipulate the controls of the optical device 10 once the optical device 10 had been positioned within the enclosure 50.

Once the system 100 has been affixed in the desired location and position, the conduit 70 may be connected to the air input aperture 66 of the enclosure 50 and clean air may be fed from the gas supply 72, through the conduit 70, and into the interior volume H of the enclosure 50. The clean air may then flow around the optical device 10 in the enclosure 50, over the lens 16 of the optical device 10, and out the lens aperture 64 of the enclosure 50. A constant supply of clean air may be provided through the air input aperture 66 such that there is a constant flow of clean air over the lens 16 of the optical device 10. The constant flow of clean air over the lens 16 of the optical device 10 may prevent dust or similar debris from landing or settling on the lens 16 of the optical device 10.

Figure 5:
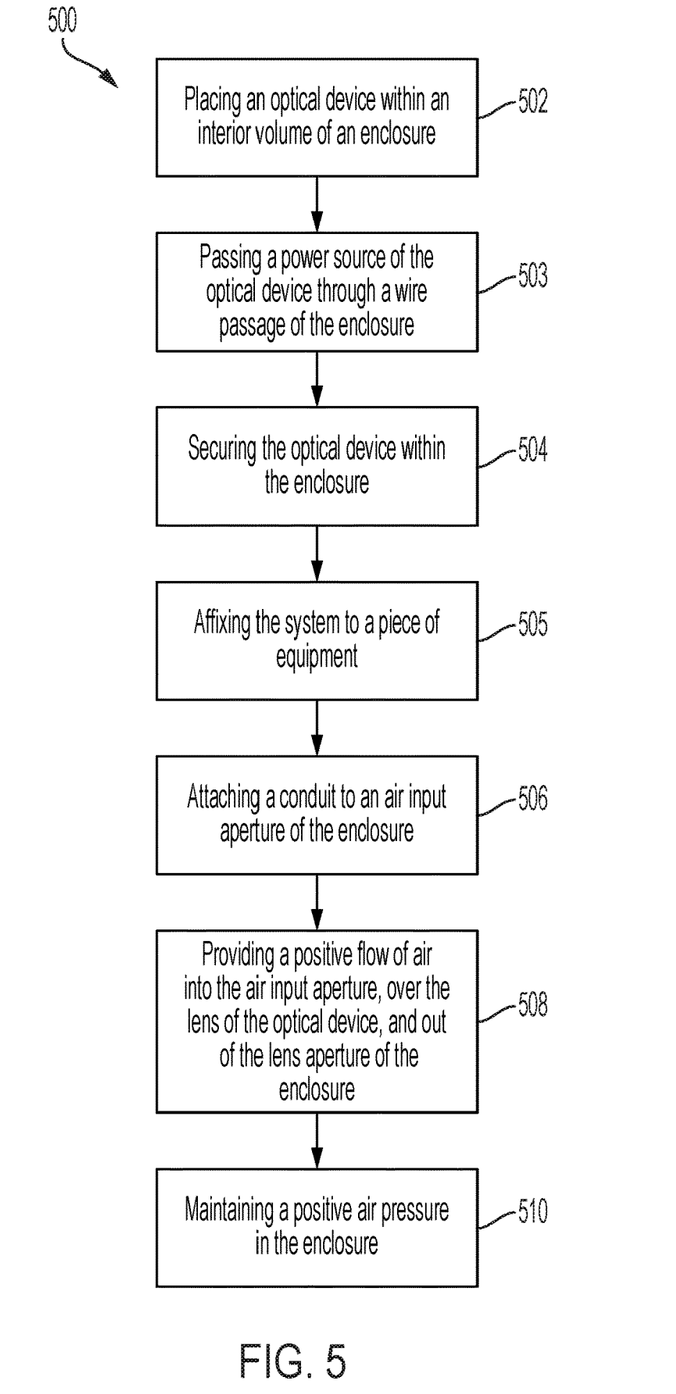
FIG. 5 is a perspective view of a system for debris mitigation according to another embodiment.

As shown in FIG. 5, a method for debris mitigation in environment with high amounts of debris 500 is depicted. In step 502, the optical device 10 is placed within the enclosure 50. As described above, the optical device 10 may be placed in the interior volume H of the enclosure 50 and the enclosure 50 may be pieced together or formed around the optical device 10.

Optionally, in step 503, the power source 17 of the optical device 10 may be passed through the cable passage 68 of the enclosure 50. The seal 74 may be placed between the power source 17 and the cable passage 68 to provide a substantially airtight seal between the cable passage 68 and the power source 17. The seal 74 may be a grommet or gland that is adjusted after the power source 17 is passed through the cable passage 68, a press-fit or snap-fit seal, or any other method or device of sealing the cable passage 68 against the power source 17. However, if the power source 17 is a battery pack or similar power source, the system 100 may not include a cable passage 68 or seal 74.

In step 504, the optical device 10 is secured within the enclosure 50 such that the lens 16 of the optical device 10 is near and aligned with the lens aperture 64 of the enclosure 50. The optical device 10 may be placed in the enclosure 50 such that air may pass between the optical device 10 and the enclosure 50 and out of the lens aperture 64. The optical device 10 may be secured within the enclosure 50 via one or more fasteners 80.

Optionally, in step 505, the system 100 may be affixed to a desired piece of equipment, machine, or other suitable structure. The system 100 may be affixed to the equipment, machine, or other suitable structure via the mount 82. One end of the mount 82 may be secured to the system 100 and the other end of the mount 82 may be secured to the equipment, machine, or structure. The system 100 may be positioned, rotated, or aligned such that the lens 16 of the optical device 10 faces the desired direction.

In step 506, the conduit 70 may be attached to the air input aperture 66 of the enclosure 50. The air input aperture 66 and the conduit 70 may be threadingly connected. The conduit 70 may be connected to the gas supply 72 to supply a positive flow of clean air through the air input aperture 66 and into the interior volume H of the enclosure 50.

In step 508, a positive flow of clean air or gas is provided into the air input aperture 66, around at portion of the optical device 10, and over the lens 16 of the optical device 10. Between the air input aperture 66 and the lens 16 of the optical device 10, the air or gas may flow around a portion or substantially all of the optical device 10. At least a portion of the air or gas may then flow out the lens aperture 64 of the enclosure 50. The clean air or gas may be provided via the gas supply 72 to maintain a positive flow of air or gas within the enclosure 50. The clean air may be provided into the enclosure 50 at a pressure sufficient to ensure that dust or similar debris does not settle or gather on the lens 16 of the optical device 10. For example, the air pressure may be adjusted based on the size of the lens aperture 64, the mass of the debris in the environment, the velocity of the debris in the environment, or any other factor or combination of factors which may affect the accumulation of debris on a lens.

In step 510, a positive air pressure is maintained in the enclosure 50 such that a constant flow of clean air or gas may blow over the lens 16 of the optical device 10. Alternatively or in addition, the positive air pressure may be maintained such that a constant flow of clean air or gas may be blown out of the lens aperture 64 of the enclosure 50. The pressure of the air may be such that dust or other similar debris in the environment is prevented from settling or gathering on the lens 16 of the optical device 10.

Figure 6:
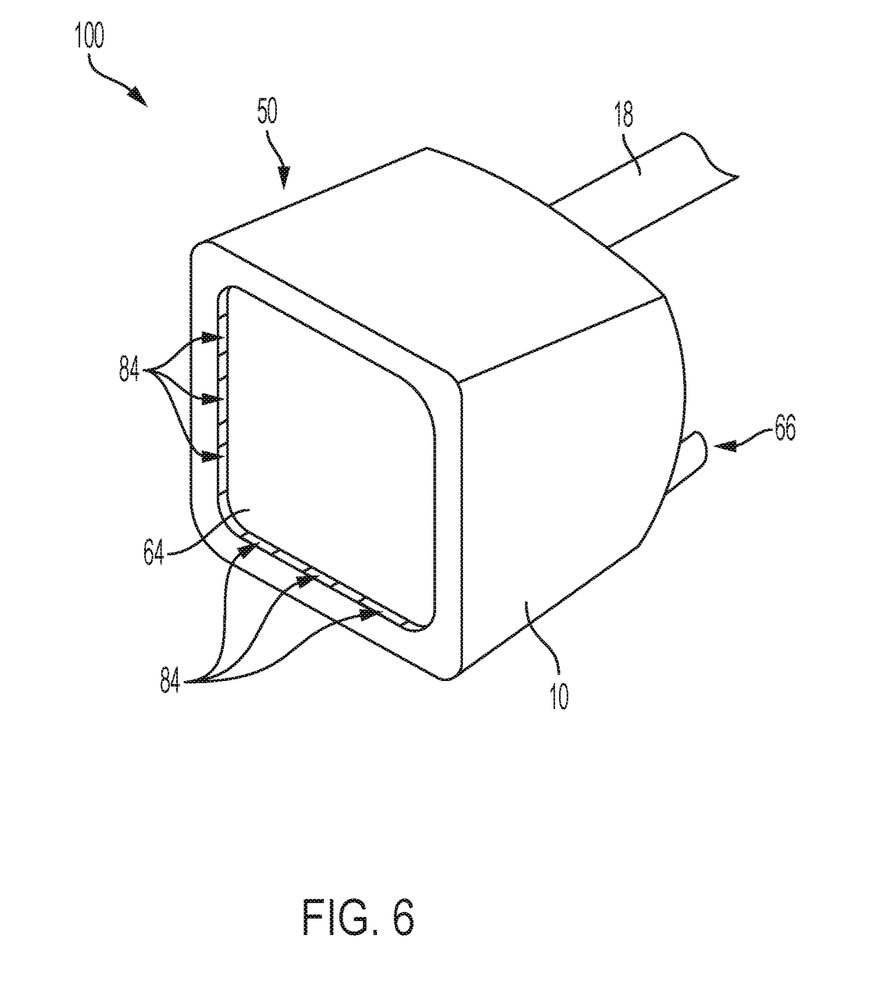
FIG. 6 is a perspective schematic view of another exemplary embodiment of an optical device.

Referring now to FIG. 6, the system 100 for debris mitigation is depicted according to another embodiment. In the depicted embodiment, the optical device 10 and the enclosure 50 are incorporated into a single component. The optical device 10 may be any type of device described herein. The optical device 10 may include a lens 16, a power source 17, a lens aperture 64, and an air input aperture 66, similarly to as detailed above. The interior of the optical device 10 may define an interior space which permits air to flow from the air input aperture 66 to the lens aperture 64. Additionally, the optical device 10 may incorporate one or more air outlet apertures 84 near or in the bezels of the optical device 10 to provide airflow over the lens 16. The system 100 may operate in substantially the same manner as previously described herein.

INDUSTRIAL APPLICABILITY

The system 100 for debris mitigation and method for debris mitigation may be integrated with a structure or machine used where a clean optical device lens is required including, but not limited to, environments with high amounts of dust and debris, such as drilling or mining operations. By incorporating the disclosed system 100 for debris mitigation of the present disclosure, the operability of an optical device 10 may be maintained even when the optical device 10 is used in environments with extreme amounts of dust or similar debris. Further, when the optical device 10 and an enclosure 50 are supplied with a constant flow of clean air, dust or similar debris may be prevented from settling on the lens 16 of the optical device 10. Moreover, where dust or similar debris is prevented from settling on the lens 16 of the optical device 10, the lens 16 of the optical device 10 does not need to cleaned, time is not required to stop operations and clean the lens 16 of the optical device 10, service personnel are not required to clean the lens 16 which may be located in inaccessible areas or on remotely operated equipment, and special equipment is not required to clean the lens 16 in a hard to reach position or location.

The inventive system 100 for mitigating dust includes an optical device 10 with a lens 16 and an enclosure 50 with a lens aperture 64 and an air input aperture 66. The optical device 10 may be positioned within the enclosure 50 and/or the enclosure 50 may be configured to allow a flow of gas or air from the air input aperture 66, over the lens 16 of the optical device 10, and out the lens aperture 64. A constant flow of clean air or gas may be provided through the air input aperture 66, such as from a clean air or gas source 72 via a conduit 70, such that a flow of gas across the lens 16 of the optical device 10 and/or a flow of gas out of the aperture 64 prevents dust or similar debris from accumulating on the lens 16 of the optical device 10.

The system 100 may be utilized in an inventive method for debris mitigation in environments with high amounts of dust and debris. The inventive method for debris mitigation includes placing an optical device 10 within an enclosure 50, securing a lens 16 of the optical device 10 near and aligned with a lens aperture 64 of the enclosure 50, attaching a conduit 70 to an air input aperture 66 of the enclosure 50, and providing a flow of clean air into the air input aperture 66, around the optical device 10, over the lens 16 of the optical device 10, and out the lens aperture 64 of the enclosure 50. Optionally, the method may include passing a power source 17 of the optical device 10 through a cable passage 68 of the enclosure 50. A seal 74 may be placed between the cable passage 68 and the power source 17. Further still, the method may optionally include affixing the system 100 to a desired piece of equipment, machine, or other suitable structure, such as via a mount 82. The optical device 10 and the enclosure 50 may then be positioned, rotated, or aligned such that the lens 16 of the optical device is facing the desired direction.

The system 100 for debris mitigation and method for debris mitigation may be integrated with a structure or machine used where a clean optical device lens is required including, but not limited to, environments with high amounts of dust and debris, such as drilling or mining operations. A constant flow of clean air may be provided through the air input aperture 66 such that a constant flow of clean air is maintained over the lens 16 of the optical device 10. The flow of clean air over the lens 16 may keep the lens 16 clean.

Because the air input aperture 66 may provide a constant flow of clean air into the enclosure 50, around the optical device 10, over the lens 16 of the optical device 10, and out of the system 100 through the lens aperture 64 of the enclosure 50, dust and similar debris may be prevent from landing, settling, or otherwise gathering on the lens 16 of the optical device 10. This ability to prevent dust or similar debris from gathering on the lens 16 of the optical device 10 may prevent the lens 16 of the optical device 10 from getting dirty. As the lens 16 of the optical device 10 may not become dirty, the lens 16 of the optical device 10 would not need to be cleaned, thereby eliminating down time and service personnel required to clean the lens 16 of the optical device 10 which may be in an inaccessible or hazardous location.

In view of the many possible embodiments to which the principles of the disclosure can be applied, it should be recognized that the illustrated embodiments are only preferred examples and should not be taken as limiting the scope of the disclosure. Rather the scope of the disclosure is defined by the following claims.

It will be appreciated that the foregoing description provides examples of the disclosed apparatus and system. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

ELEMENT LIST

| Element Number | Element Name |
| --- | --- |
| 10 | optical device |
| 12 | front end |
| 14 | rear end |
| 16 | lens |
| 17 | power source |
| 18 | conduit |
| 50 | enclosure |
| 52 | front end |
| 54 | rear end |
| 56 | first side |
| 58 | second side |
| 60 | top surface |
| 62 | bottom surface |
| 64 | aperture |
| 66 | passage |
| 68 | passage |
| 70 | conduit |
| 72 | gas supply |
| 74 | seal |
| 80 | fasteners |
| 82 | mount |
| 84 | air outlet apertures |
| 100 | system |
| 500 | debris |
| 502 | step |
| 503 | step |
| 504 | step |
| 505 | step |
| 506 | step |
| 508 | step |
| 510 | step |

What is claimed is:

1. A system for mitigating dust accumulation on a surface, the system comprising:
    an optical device including a housing having a front end, a rear end opposite the front end, and a lens positioned at the front end;
    an enclosure including an air input aperture and a lens aperture and defining an interior volume, wherein the housing of the optical device is disposed within the interior volume such that the lens is adjacent the lens aperture; and
    a conduit connected to the air input aperture of the enclosure and configured to supply a constant supply of gas into the interior volume of the enclosure;
    wherein the enclosure is configured to route the constant supply of the gas from the air input aperture, through the interior volume directly along the housing of the optical device, over the lens of the optical device, and out the lens aperture of the enclosure, to prevent dust and/or debris from settling or gathering on the lens, and
wherein a pressure of the constant supply of gas is set based on a total area of the lens aperture, mass of debris environment, and/or velocity of debris environment.

2. The system for dust mitigation of claim 1, wherein the lens aperture of the enclosure corresponds substantially in size and shape to the lens of the optical device.

3. The system for dust mitigation of claim 1, further comprising a power source electrically connected to the optical device.

4. The system for dust mitigation of claim 3, wherein the enclosure includes a cable passage which may receive a cable electrically connected to the power source.

5. The system for dust mitigation of claim 4, further comprising a seal disposed between the cable passage and the cable.

6. The system for dust mitigation of claim 1, wherein the optical device is a camera.

7. The system for dust mitigation of claim 1, wherein the optical device is a lamp.

8. The system for dust mitigation of claim 1, wherein the conduit is connected to a gas supply.

9. A method for mitigating dust accumulation on a lens of an optical device, the optical device having a housing with a front end and a rear end opposite the front end, wherein the lens is positioned at the front end, the method comprising the steps of:
   placing the housing of the optical device within an interior volume of an enclosure;
   securing the optical device within the enclosure such that the lens of the optical device is near and aligned with a lens aperture of the enclosure;
   attaching a conduit to an air input aperture of the enclosure;
   providing a constant positive flow of air into the air input aperture, through the interior volume directly along the housing of the optical device, over the lens of the optical device, and out of the lens aperture of the enclosure, to prevent dust and/or debris from settling or gathering on the lens; and
   maintaining the constant positive flow of air into the air input aperture, through the interior volume directly along the housing of the optical device, over the lens of the optical device, and out of the lens aperture of the enclosure, to prevent debris from settling or gathering on the lens,
   wherein a pressure of the constant positive flow of air is set based on a total area of the lens aperture, mass of debris environment, and/or velocity of debris environment, and
   wherein the positive flow of air flows directly around substantially all of the housing of the optical device before exiting the lens aperture.

10. The method of claim 9, further comprising the step of electrically connecting a power source to the optical device through a cable passage of the enclosure.

11. The method of claim 10, further comprising the step of securing a seal between the power source and the cable passage.

12. The method of claim 9, wherein the constant positive flow of air gas is supplied from an air supply.

13. The method of claim 9, wherein the optical device is secured within the enclosure with a fastener.

14. The method of claim 9, wherein the conduit and air input aperture are threadingly connected.

15. An optical device for use in an environment with high amounts of debris, the optical device comprising:
   an enclosure having a front end, a rear end, and one or more sides defining an interior space, the front end defining a lens aperture;
   a lens positioned at the front end and aligned with the lens aperture;
   an air input aperture positioned on the enclosure rearward of the lens; and
   a power source configured to provide power to operate the optical device,
   wherein the optical device and the enclosure are configured to route a constant flow of pressurized air from the air input aperture, through the interior space, directly along the optical device, over the lens, and out of the lens aperture, to prevent dust and/or debris from settling or gathering on the lens,
   wherein a pressure of the constant supply of gas is set based on a total area of the lens aperture, mass of debris environment, and/or velocity of debris environment.

16. The optical device of claim 15, further comprising an air outlet aperture near a bezel of the optical device.

17. The optical device of claim 15, wherein the optical device is a camera.

18. The optical device of claim 15, wherein the optical device is a lamp.

* * * * *